May 12, 1936.  D. E. TELL  2,040,284
METHOD AND APPARATUS FOR MEASURING AND CONTROLLING ABSOLUTE PRESSURE
Filed June 15, 1932
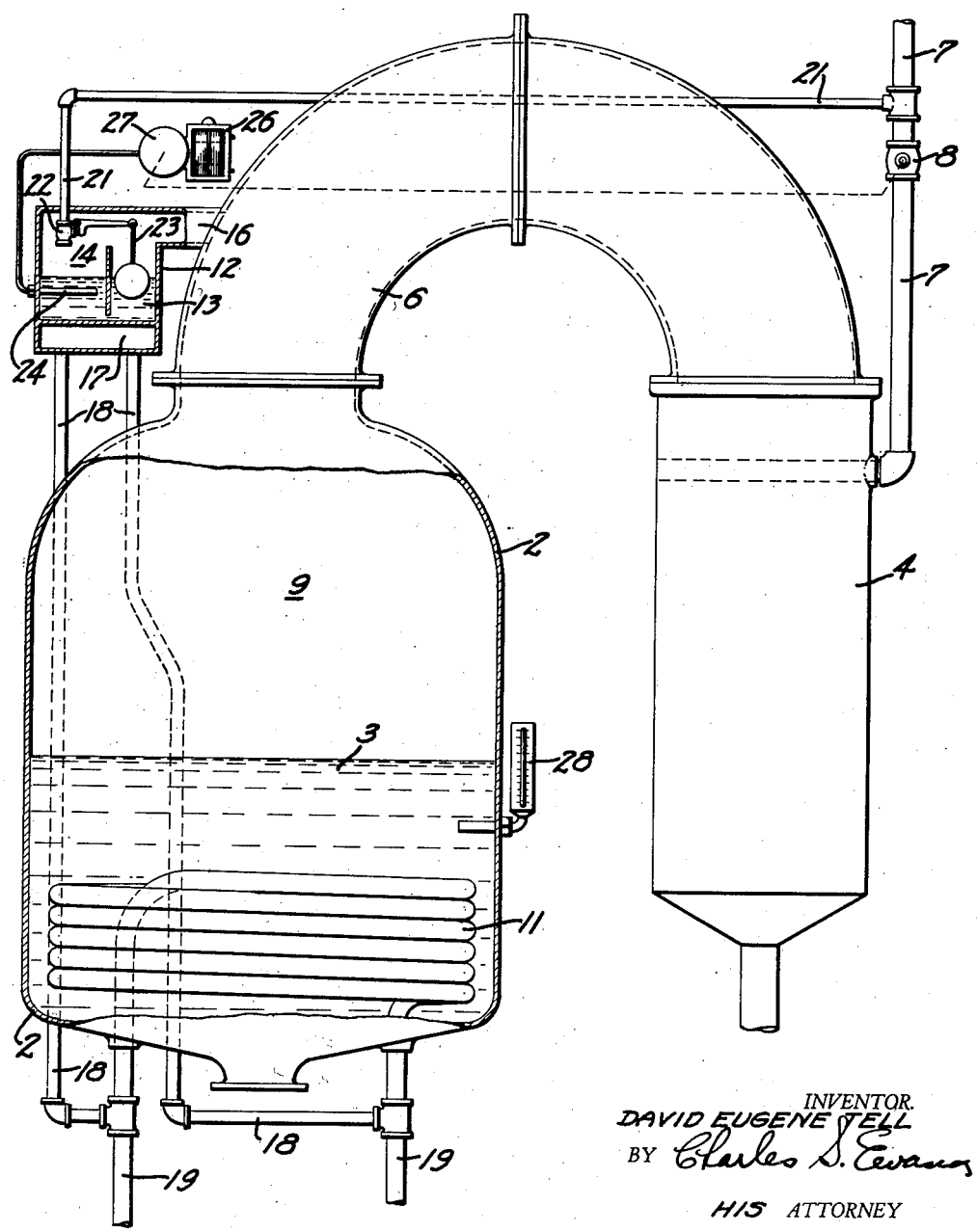
INVENTOR.
DAVID EUGENE TELL
BY Charles S. Evans
HIS ATTORNEY Patented May 12, 1936

2,040,284

UNITED STATES PATENT OFFICE 2,040,284

METHOD AND APPARATUS FOR MEASURING AND CONTROLLING ABSOLUTE PRESSURE

David Eugene Tell, San Francisco, Calif.

Application June 15, 1932, Serial No. 617,393

8 Claims. (Cl. 159—44)

My invention relates to the measurement and control of absolute pressure.

It is among the objects of my invention to provide means for measuring absolute pressure accurately, and independently of the atmospheric pressure.

Another object of my invention is to provide means for accurately controlling the absolute pressure in a container.

Another object of my invention is to provide a control means of the character described which will automatically maintain a substantially constant absolute pressure.

A more specific object of my invention is to provide apparatus for accurately measuring the water content of boiling syrup in a vacuum pan.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawing:

The figure of the drawing is a side view, partly in section and partly in elevation, showing an apparatus embodying the improvements of my invention in conjunction with a vacuum pan and associated condenser.

In terms of broad inclusion, the method of measuring absolute pressure embodying my invention comprises boiling a liquid under the same pressure as that being measured, and then measuring the temperature of the boiling liquid. Since the boiling point of the liquid depends upon the conditions of absolute pressure under which it boils, the measured temperature reflects accurately the absolute pressure. The temperature measuring means may thus conveniently be calibrated in units of absolute pressure instead of thermometric degrees. The method of controlling the absolute pressure in a container embodying my invention comprises utilizing the changes in the temperature of the boiling liquid to alter the pressure in the container.

The apparatus for measuring and controlling the absolute pressure in a container preferably comprises a chamber partially filled with a liquid and connected with the container so that the space above the liquid in the chamber communicates with the pressure space in the container. Means are provided for heating a liquid to its boiling point, and means are provided for measuring the temperature of the boiling liquid. Means are also provided for changing the pressure in the container, and means actuated by the temperature measuring means are provided for controlling the pressure changing means.

The method and apparatus embodying my invention has an important application in the manufacture of sugar. In this case the evaporating kettle or vacuum pan holding the boiling syrup is the container, and the apparatus of my invention is connected with the pan to maintain a substantially constant absolute pressure above the boiling syrup. A thermometer placed in the boiling syrup under these conditions reflects accurately the change in water content of the boiling syrup.

In greater detail, the method and apparatus for measuring and controlling absolute pressure embodying my invention is illustrated and described in conjunction with apparatus employed in the crystallization of sugar, such as the vacuum pan and connected condenser commonly found in sugar refineries. While this showing illustrates an important application of the method and apparatus embodying my invention, it is understood that there are other devices and equipment in connection with which my method and apparatus finds valuable application.

Returning to the example chosen for purposes of illustration and referring to the drawing, the evaporating kettle or vacuum pan 2 is usually in the nature of a vertical metal cylinder provided with suitable means for introducing the syrup 3 from which the sugar is to be crystallized. These pans are also provided with suitable means for removing the crystallized sugar. The pan 2 is connected to the condenser 4 by a suitable overhead duct 6 through which the steam rising from the boiling syrup in the pan passes over into the condenser.

The condenser is ordinarily of the barometric type, into which cooling water is fed by a pipe 7. A valve 8 is provided in the pipe 7 to regulate the amount of cooling water admitted to the condenser. By this arrangement a vacuum is created in the pan 2 through the action of the condenser in condensing the steam passing over from the pan, and the degree of vacuum in the pressure space 9 above the syrup in the pan depends upon the amount of cooling water entering the condenser, as will readily be understood. The syrup in the pan is preferably heated to the boiling point by a steam coil 11 positioned adjacent the bottom of the pan.

The apparatus embodying my invention includes a chamber 12 partially filled with a suitable liquid 13, such as water, and connected with the vacuum pan 2 so that the space 14 above the liquid in the chamber communicates with the pressure space 9 above the syrup in the pan. The duct 16 connecting the chamber 12 with the vacuum pan is of sufficient size to prevent a pressure drop, so that the liquid 13 boils under the same conditions of pressure as the syrup 3. The means for heating the liquid 13 to its boiling point may conveniently be a steam jacket 17 connected by suitable ducts 18 with the steam pipes 19 leading to the heater coil 11 in the vacuum pan.

Means are also provided for replenishing the liquid 13 in the chamber. For this purpose a supply pipe 21 is positioned to project into the chamber. A valve 22 is mounted on the inner end of the pipe 21, and a suitable float mechanism 23 is provided to actuate the valve. By this arrangement a constant level of liquid is maintained in the chamber 12. When the liquid 13 is water the supply pipe 21 may conveniently be connected with the supply pipe 7 feeding water to the condenser.

Means are provided for measuring the temperature of the boiling liquid in the chamber 12, and to this end a thermometer bulb 24 is mounted to project into the chamber so that it is immersed in the liquid. This bulb is connected with a suitable recorder or indicator 26; any of the well known recording thermometers being suitable for this purpose.

Since the boiling point of the liquid 13 depends upon the pressure in the space 14, and consequently on the pressure in the space 9, any change in the boiling point of the liquid 13 as indicated by the recorder 26 will indicate a change in the absolute pressure in the space above the boiling syrup in the pan. The recorder 26 may conveniently be calibrated to read directly in units of absolute pressure instead of thermometric degrees. If the liquid 13 is water the data for this calibration may be taken directly from standard steam tables, as will be readily understood by those skilled in the art.

A suitable temperature controller 27, which also may be of any well known construction, is also connected with the thermometer bulb 24, and is arranged to control the opening and closing of the valve 8 which regulates the cooling water admitted to the condenser. Thus, as the boiling point of the liquid 13 changes, due to changes in pressure in the space 9 above the syrup 3 in the pan, the temperature controller 27 operates to change the setting of the valve 8. This changes the amount of cooling water admitted to the condenser. Consequently, the rate at which the steam is being condensed is changed so as to alter the pressure above the syrup 3.

For example, should the pressure in the pan increase above a predetermined value, the increased pressure will cause the water in the chamber 12 to boil at a higher temperature. Under these conditions the controller 27 will actuate the valve 8 to admit more water to the condenser 4, to reduce the pressure in the pan. Similarly a decrease in pressure in the pan will operate to decrease the supply of water admitted to the condenser, so as to increase the pressure. As a result, the absolute pressure above the boiling syrup is automatically maintained at a substantially constant value.

As the syrup boils the water is evaporated therefrom; consequently, the water content of the syrup is continually decreasing. In the crystallization of sugar it is desirable to know at any given time just what this water content is. For this purpose a thermometer 28 is provided with its bulb immersed in the boiling syrup. The boiling point of the syrup depends both upon the composition of the syrup and the pressure under which it is boiled. Since the absolute pressure above the syrup is maintained constant, changes in the temperature at which the syrup boils will reflect accurately the change in the water content of the boiling syrup.

It is obvious that the control may be applied to the steam supply to the vacuum pan, or the valve through which syrup is introduced into the pan, instead of the cooling water admitted to the condenser; the broad idea being of course a control based on an accurate measurement of the absolute pressure within the pan. While I have described the method and apparatus embodying my invention in connection with equipment used in conjunction with a particular industry, it is understood that the method and apparatus will find valuable application in other industries. There are many commercial operations where it is important or essential to maintain a constant pressure in a container. In all cases where the vapors from water or other liquids are not objectionable the controller of my invention would operate satisfactorily.

It is understood of course that while the method and apparatus embodying my invention is particularly well adapted to pressures below atmospheric, the same may be employed satisfactorily to measure and control absolute pressures above atmospheric pressure. The greatest accuracy of the apparatus however is in connection with the lower pressures. The sensitiveness is determined by the relationship between the change in the unit which is desired to be controlled, and the effect the change produces in the unit which serves as the means of control. Since the change in the boiling point of water at extremely low pressures is much more rapid than the change in pressure, obviously a greater sensitivity can be obtained under these conditions.

For example, water at one pound absolute pressure boils at 101.8 degrees Fahrenheit, and water at two pounds absolute pressure boils at 126.1 degrees, Fahrenheit, or a difference of 24.3 degrees Fahrenheit for one pound difference in pressure. If it is assumed that it is practicable to measure the temperature of boiling water to one-half degree, it follows that the absolute pressure may be measured to approximately one-fiftieth of a pound.

I claim:

1. An apparatus for indicating the water content of boiling syrup in a vacuum pan comprising means for changing the pressure in the steam space above the syrup, a chamber partially filled with water and connected with the vacuum pan so that the space above the water in the chamber communicates with the pressure space in the pan, means for heating the water in the chamber to its boiling point, means for measuring the temperature of the boiling water in the chamber, means actuated by said temperature measuring means for controlling the pressure changing means to maintain a substantially constant pressure above the syrup in the pan, and means for measuring the temperature of the boiling syrup.

2. An apparatus for indicating the water content of boiling syrup in a vacuum pan comprising water cooled condenser means for changing the pressure in the steam space above the syrup, a valve for regulating the cooling water admitted to the condenser, a chamber partially filled with water and connected with the vacuum pan so that the space above the water in the chamber communicates with the pressure space in the pan, means for heating the water in the chamber to its boiling point, means for measuring the temperature of the boiling water in the chamber, means actuated by said temperature measuring means for controlling the condenser cooling water valve to maintain a substantially constant pressure above the syrup in the pan, and means for measuring the temperature of the boiling syrup.

3. An apparatus for indicating the water content of boiling syrup in a vacuum pan, comprising means for maintaining the absolute pressure above the syrup in the pan at a substantially constant value, and means for measuring the temperature of the boiling syrup.

4. A system for controlling the absolute pressure in a receptacle, comprising a water boiler in which the same pressure as that in said receptacle is maintained, a valve controlling a supply of fluid adapted to regulate and determine the absolute pressure in said receptacle, and a temperature control apparatus including a thermometric bulb in said water boiler for effecting the operation of said valve.

5. A system for controlling the absolute pressure in a receptacle, comprising a water boiler in which the same pressure as that in said receptacle is maintained, a condenser connected to said receptacle, a valved water supply to said condenser, and a temperature control apparatus for effecting the operation of the water supply valve including a thermometric bulb in said water boiler.

6. A system for controlling the absolute pressure in a receptacle, comprising a water boiler in which the same pressure as that in said receptacle is maintained, a condenser connected to said receptacle, a water supply pipe connected to said condenser, a valve in said pipe, an adjustable control apparatus for operating the valve, and a thermometric bulb in said water boiler connected to and actuating said control apparatus; whereby the water supplied to the condenser will regulate the absolute pressure in the receptacle and maintain the predetermined boiling point of the water in the water boiler.

7. The combination of a vaporizer, a condenser connected therewith, a valved water supply to said condenser, a water boiler in which the same pressure as that in the vaporizer is maintained, and a temperature control apparatus interposed between said water boiler and the water supply, responsive to the temperature in said water boiler and effective to operate said valve; whereby the water supplied to the condenser will regulate the absolute pressure in the vaporizer to maintain the predetermined boiling point of the water in the water boiler.

8. In an apparatus of the type described, the combination comprising a vacuum pan, heating means in said pan, a condenser connected to said pan, means for supplying cold water to the condenser, a closed water boiler in communication with said pan, means for boiling the water in said boiler, and means subject to the temperature of the water in the boiler for controlling the means which supplies cold water to the condenser whereby the pressure in the pan may be maintained at a desired value.

DAVID EUGENE TELL.